United States Patent [19]

Patterson

[11] 3,929,674

[45] Dec. 30, 1975

[54] BORIDE-CONTAINING METALLIZATIONS

[75] Inventor: Frank Knowles Patterson, Wilmington, Del.

[73] Assignee: E. I. Du Pont de Nemours & Company, Wilmington, Del.

[22] Filed: June 3, 1974

[21] Appl. No.: 476,032

[52] U.S. Cl. .................... 252/514; 106/1; 252/518; 428/427; 428/434

[51] Int. Cl.$^2$ .......................................... H01B 1/02

[58] Field of Search ...... 252/514; 106/1; 117/123 B, 117/124 C, 227; 428/427, 434

[56] References Cited

UNITED STATES PATENTS

| | | | |
|---|---|---|---|
| 3,537,892 | 11/1970 | Milkovich et al. | 252/514 X |
| 3,756,834 | 9/1973 | Short | 106/1 |
| 3,827,891 | 8/1974 | Larry | 252/514 X |
| 3,830,651 | 8/1974 | Minneman et al. | 252/514 X |

*Primary Examiner*—Benjamin R. Padgett
*Assistant Examiner*—E. Suzanne Parr

[57] ABSTRACT

Improved conductor compositions useful in the electronic arts, said compositions comprising finely divided noble metal powder, aluminum boride powder, and optional inorganic binder powder dispersed in an inert vehicle. Other borides, boron, and silicides may also be present. Such compositions may be printed on substrates and fired (sintered) to form microcircuit patterns, end terminations, etc.

16 Claims, No Drawings

BORIDE-CONTAINING METALLIZATIONS

BACKGROUND OF THE INVENTION

This invention relates to conductor compositions useful in the electronic arts, and more particularly, to such compositions comprising noble metals.

Comparatively little is known of the chemical properties of metal borides and silicides, since most attention has been directed towards their preparative methods, structural characterization (for $AlB_{12}$ see J. A. Kohn et al., Ed., *Boron - Synthesis, Structure and Properties*, Plenum Press, New York, 1960, p. 75), and physical and electrical properties (B. Aronsson, *Arkim for Kemi Bd.* 16 nr 36, 1960, pp. 379–423).

Metal borides and silicides are reported to be inert to oxidation at room temperature. At elevated temperatures, borides are oxidized, although rates of oxidation vary (Greenwood et al., *Quart. Revs.* [London] 20, p. 441, 1966). Some borides, such as $TiB_2$ (A. Munster et al., *Z. Phys. Chem.* 25, p. 116, 1960), form protective glass oxide films; the rate of oxidation is controlled by oxygen diffusion through this film. The temperatures at which extensive oxidation occurs vary widely from one report to the next, owing to differences in purity, particle size, etc.; however, for both silicides and borides, the oxidation resistance increases with increasing silicon or boron content.

Despite interest in the structural polymorphs of $AlB_{12}$, and vickers hardness properties of the polymorphs (Kohn et al., *Z. Phys. Chem.* 25, p. 140, 1966), there has been little use made of $AlB_{12}$. High temperature oxidation of $AlB_{12}$, or stability to oxidation, has been of little interest.

There is a need in the electronic thick-film industry for conductor compositions which exhibit improved adhesion to dielectric substrates upon being fired (sintered) to electrically and physically continuous films. It is often desirable to avoid, or reduce the amount of, the standard adhesion promoters (inorganic binders) normally present in the unfired composition. Where inorganic binders (glass, $Bi_2O_3$, CdO, PbO, $V_2O_3$, etc.) are used, however, there is a need for effective adhesion promoting additives in any event.

German Patent Publication OS 2,222,695, published November 22, 1973, refers to compositions of boron silicide plus Mo or W glasses. Chemical Abstracts 58, 9942 g refers to bulk (not film) resistors of silicon boride plus $MoS_2$. U.S. Pat. No. 3,622,523, issued Nov. 23, 1971, teaches switch compositions of vanadium glass and boron, the compositions of my commonly assigned application U.S. Ser. No. 248,115, filed Apr. 27, 1972, being an improvement over those of U.S. Pat. No. 3,622,523, wherein at least some of the boron is replaced by boron silicide.

By "thick film" is meant films obtained by printing dispersions of powders (usually in an inert vehicle) on a substrate using techniques such as screen and stencil printing, as opposed to the so-called "thin" films deposited by evaporation or sputtering. Thick-film technology is discussed generally in *Handbook of Materials and Processes for Electronics*, C. A. Harper, Editor, McGraw-Hill, New York, 1970, Chapter 11.

SUMMARY OF THE INVENTION

This invention provides printable (e.g., screen or stencil) metallizing compositions of a finely divided conductor powder selected from the class of noble metals consisting of Pt, Pd, Au, Ag, and mixtures, alloys, and oxides (such as PdO) thereof dispersed in an inert liquid vehicle, additionally comprising finely divided aluminum boride. The compositions may comprise, in addition to aluminum boride, a finely divided refractory additive powder which is elemental boron, a boride other than aluminum boride, a silicide, or mixtures thereof. Preferred are binary metal borides and silicides. The weight of the refractory additive powder is up to twice the weight of the aluminum boride.

The compositions may further comprise an inorganic oxide binder powder (such as glass, $Bi_2O_3$, CuO, CdO, $V_2O_5$, etc.) for said conductor powder, in an amount up to 50% of the weight of said conductor (noble metal) powder.

The conductor powder is preferably metallic Pt, Pd, Au, Ag, or mixtures or alloys thereof.

Also a part of this invention are fired (sintered or electrically continuous) conductor patterns of the above compositions, adherent to a dielelctric substrate.

DETAILED DESCRIPTION

The present invention relates to an improvement in conventional noble metal conductor compositions, and hence the nature of constituents in such known compositions, their relative proportions, and the details of their use (printing and firing) are well known to those skilled in the art. Representative patents on noble metal conductor compositions are Kelemen U.S. Pat. No. 3,674,515, issued July 4, 1972; Cole U.S. Pat. No. 3,615,734, issued Oct. 26, 1971; Hoffman U.S. Pat. No. 3,516,949, issued June 23, 1970; Short U.S. Pat. No. 3,505,134, issued Apr. 7, 1970; Smith German Patent Publication OS 2,311,392, published Sept. 13, 1973; etc.

The conductor compositions are based upon noble metals, i.e., they comprise one or more of Pt, Pd, Au and Ag, either as elemental powders or oxides thereof, mixtures or alloys thereof. The alloys may be the coprecipitated alloys of, e.g., Hoffman U.S. Pat. No. 3,385,799, issued May 28, 1968, or Short U.S. Pat. No. 3,756,834, issued Sept. 4, 1973.

Optionally present in these compositions is a finely divided inorganic binder, to promote adhesion of the metal to the substrate on firing. The chemical nature of the inorganic binder is not critical; the binder is selected according to principles well known in the art dependent upon the final properties desired. Glassy (vitreous) and/or ceramic (crystalline) materials may be employed. Thus, typical glasses may be used, as may nonglassy oxides such as copper oxide, cadmium oxide, vanadium oxide, bismuth oxide, etc., mixtures of any of these such as glass-ceramics, etc.

The above-described powders are finely divided, i.e., the particles are generally sufficiently finely divided to pass through a 200 mesh screen, preferably a 400 mesh screen (U.S. Standard Sieve Scale). The powders are finely divided so as to be useful in conventional screen or stencil printing operations, and to facilitate sintering. The compositions are prepared from the solids and vehicles by mechanical mixing and printed as a film on ceramic dielectric substrates in the conventional manner. Any inert liquid may be used as the vehicle. Water or any one of various organic liquids, with or without thickening and/or stabilizing agents and/or other common additives, may be used as the vehicle. Exemplary of the organic liquids which can be used are the aliphatic alcohols; esters of such alcohols, for example, the acetates and propionates; terpenes such as pine oil, terpineol and the like; solutions of resins such as the polymethacrylates of lower alcohols, or solutions of ethylcellulose, in solvents such as pine oil and the monobutyl ether of ethylene glycol monoacetate. The vehicle may contain or be composed of volatile liquids to promote fast setting after application to the substrate.

The ratio of inert liquid vehicle to solids in the dispersions may vary considerably and depends upon the manner in which the dispersion is to be applied and the kind of vehicle used. Generally, from 0.1 to 20 parts by weight of solids per part by weight of vehicle will be used to produce a dispersion of the desired consistency.

To such known noble metal dispersions, this invention adds aluminum boride or mixtures of aluminum boride with other borides and/or with silicides and/or with elemental boron. The preferred aluminum boride is $AlB_{12}$. The amount of aluminum boride is an amount equal to at least 0.05% of the weight of noble metal in the composition. Preferably the amount of aluminum boride is 0.15–0.35% of the weight of noble metal, the optimum amount of aluminum boride being dependent upon the particular noble metal(s) involved, and the nature and amount (if any) of inorganic binder, other borides, silicides, or elemental boron present. Generally, if inorganic binder is present, it may be up to 50% of the weight of the noble metal conductor powder. Also, if other borides, silicides and/or elemental boron are present, their total weight is no more than twice that of the aluminum boride present.

The optional borides (other than aluminum boride) are preferably binary metal borides of the formula type $Me_xB_y$, where $x$ and $y$ correspond to the following formulas with integral values: $Me_4B$, $Me_3B$, $Me_2B$, $Me_3B_2$, MeB, $MeB_2$, $Me_2B_5$, $MeB_4$, $MeB_6$, and $MeB_{12}$. The metal boride $Me_xB_y$ comprises no more than two thirds by weight of the total $AlB_{12}/Me_xB_y$ mixture. More preferred metal borides $Me_xB_y$ are those in which the Me/B atomic ratio is less than or equal to one. Representative metals for the above borides are discussed in N. N. Greenwood, et al., Quart. Revs. (London) 20, Table I, pp. 442–3 (1966).

Optional silicides are preferably stoichiometric binary metal silicides of the general formula type $Me_xSi_z$, where $x$ and $z$ correspond to the following formulas with integral values: $Me_6Si$, $Me_4Si$, $Me_2Si$, $Me_5Si_3$, $Me_5Si_4$, MeSi, and $MeSi_2$. The metal silicide comprises no more than two thirds by weight of the total $AlB_{12}/Me_xSi_z$ mixture. Preferred binary metal silicides are those in which Me also corresponds to a glass forming or conditional glass forming oxide. B and Ti are representative of these cases, respectively. Other preferred silicides are those in which Me is not necessarily a glass forming or conditional glass forming oxide and where the Me/Si ratio is less than or equal to one. Representative binary silicides for most of the aforementioned formulas are discussed in B. Aronsson, Askin. For Kemi, Bd 16 nr 36, Table 2, pp. 386–88, 1960 and in *Structural Inorganic Chemistry*, A. F. Wells, 3rd edition, pp. 770–4, Oxford Press, 1962.

Firing or sintering of the powder compositions of the present invention normally occurs at temperatures in the range 750°–950°C., for 5 minutes to 2 hours, depending on the particular compositions employed and the desired degree of sintering, as will be known to those skilled in the art. Generally, shorter firing times may be employed at higher temperatures.

EXAMPLES

The following examples are given to illustrate the present invention. All parts, percentages, ratios, etc., in the specification and claims are given by weight, unless otherwise stated. All the inorganic materials used herein were sufficiently finely divided to pass through at least a 325 mesh screen. Various noble metals were used, and where glass powders were used, they were as defined in Table I.

TABLE I

GLASS POWDERS UED IN EXAMPLES

Glass A: 89.6% PbO, 6.0% $SiO_2$, 2.8% $B_2O_3$, 1.0% $Al_2O_3$

Glass B: 10.9% PbO, 9.4% $SiO_2$, 1.2% $B_2O_3$, 1.1% $Al_2O_3$, 2.4% CaO, 75% $Bi_2O_3$ Glass C: 59.6% CdO, 14.3% $SiO_2$, 16.5% $B_2O_3$, 2.3% $Al_2O_3$, 7.3% $Na_2O$ Glass D: 43.5% PbO, 37.5% $SiO_2$, 4.9% $B_2O_3$, 4.3% $Al_2O_3$, 9.8% CaO The vehicle used was 10% ethylcellulose in 90% terpineol. The borides which were used are described in Table II.

TABLE II

| Reagent | Source | Purity (%) | Particle Size |
|---|---|---|---|
| $AlB_{12}$ | Cerac-Pure, Inc. | 97 | −325 mesh |
| $LiB_{12}$ | " | 99 | −200 mesh (a) |
| $CaB_6$ | " | 99 | −200 mesh (a) |
| $TiB_2$ | " | 99 | −325 mesh |
| $Mo_2B_5$ | " | 99 | −325 mesh |
| $Ni_3B$ | " | 99 | −325 mesh (a) |
| B | American Potash Co. | 92–98 | −400 mesh |
| $Cr_3Si$ | Cerac-Pure, Inc. | 99 | −200 mesh |
| $TiSi_2$ | " | 99 | −325 mesh |
| $Ti_5Si_3$ | " | 99 | −325 mesh |
| $B_4Si$ | " | 99 | −325 mesh |
| $B_6Si$ | " | 99 | −325 mesh |
| NbB | " | 99 | −325 mesh |
| $NbB_2$ | " | 99 | −325 mesh |

(a) Screened to −400 mesh.

Examples 1–18 and Comparative Showings A–F

In these runs the performance of microcircuit compositions of the present invention (noble metal and boride powder) which contain glass binder powder (optional in this invention) is evaluated, in several instances versus similar compositions containing no borides. The type of noble metal was varied in these examples, being either a single metal or a mixture of noble metal powders; the boride was either $AlB_{12}$ or a mixture thereof with other borides, or silicides or elemental boron.

After the compositions had been blended in the proportions set forth in Table III, they were screen printed on 96% $Al_2O_3$ substrates (Alsimag 614) through a patterned 200-mesh screen having nine 80-mil squares aligned in a 3 by 3 matrix. The prints were dried at 100°C. for 10 minutes; the printed substrates were then fired through a belt furnace for a total cycle of 60 minutes with 8–10 minutes residence time at a peak temperature of 850°C. In some instances more than one 850°C. fire was used as indicated in Table III. For adhesion tests, wire leads were attached to the conductor pads by laying a No. 20 American wire gauge tinned copper wire across 3 of the pads. The leads were bonded to the pads with a 12% In/70% Sn/18% Pb solder at 212°C. in the case of the gold metallizations of Runs 1–4 and A (16 seconds immersion), using a flux (Indium Corp. of America No. 3 flux). For the compositions of Runs 5–18 and C–D, the leads were bonded with a 62 Sn/36 Pb/2 Ag solder at 220°C. (10 seconds immersion) using a mildly activated rosin flux.

Adhesion (bond strengths) were determined by pulling the soldered leads at a 90° angle to the pads using a Chatillon tester at a strain rate of 0.5 inch/min.

Example 19 and Showing G

Examples 20–31

These runs report the evaluation of a series of microcircuit compositions of this invention which do not contain glass binder. Examples 25 and 26 do contain an optional inorganic binder, $Bi_2O_3$ and PbO, respectively. Although no glass is present in the compositions as printed, it is probable that glass is formed in situ during firing by oxidation of the borides (and silicides, if any).

TABLE III

| Run No. | Components and Parts by Weight: Noble Metal | Binder | Vehicle | Additive | Wt. $AlB_{12}$ as Percent of wt. of Noble Metal | Adhesion (Pounds Pull): Unaged | aged (150°C., 48 hr.) |
|---|---|---|---|---|---|---|---|
| A | 82 Au | 5.5 Glass A | 12.5 | — | — | 3.6 | — |
| 1 | " | " | " | 0.1 $AlB_{12}$ | 0.12 | 5.0 | — |
| 2 | " | " | " | 0.3 $AlB_{12}$ | 0.37 | 4.4 | — |
| 3 | " | " | " | 0.1 $AlB_{12}$<br>0.1 $TiB_2$ | 0.12 | 6.3 | — |
| 4 | " | " | " | 0.1 $AlB_{12}$<br>0.1 $Ni_3B$ | 0.12 | 3.8 | — |
| B | 45 Pd/18 Ag | 16 Glass B | 21 | — | — | 4.7 | — |
| 5 | " | " | " | 0.3 $AlB_{12}$ | 0.48 | 4.8 | — |
| 6 | " | " | " | 0.1 $AlB_{12}$<br>0.1 $LiB_{12}$ | 0.16 | 5.4 | — |
| 7 | " | " | " | 0.1 $AlB_{12}$<br>0.1 $CaB_6$ | 0.16 | 6.0 | — |
| 8 | " | " | " | 0.1 $AlB_{12}$<br>0.1 $TiB_2$ | 0.16 | 5.7 | — |
| 9 | " | " | " | 0.1 $AlB_{12}$<br>0.1 $Mo_2B_5$ | 0.16 | 6.0 | — |
| 10 | " | " | " | 0.1 $AlB_{12}$<br>0.1 $Ni_3B$ | 0.16 | 5.7 | — |
| 11 | " | " | " | 0.1 $AlB_{12}$<br>0.1 B | 0.16 | 6.2 | — |
| 12 | 45 Pd/18 Ag | 16 Glass B | 21 | 0.1 $AlB_{12}$<br>0.1 $B_4Si$ | 0.16 | 6.4 | — |
| 13 | " | " | " | 0.1 $AlB_{12}$<br>0.1 $B_6Si$ | 0.16 | 8.0 | — |
| 14 | " | " | " | 0.1 $AlB_{12}$<br>0.1 $TiSi_2$ | 0.16 | 6.6 | — |
| C | 17 Pd/48 Au | 3 Glass C | 20 | — | | 5.6 | 4.0 |
| 15 | " | " | " | 0.1 $AlB_{12}$ | 0.15 | 6.0 | 4.3 |
| D[a] | " | " | " | — | | 4.9 | 2.6 |
| 16[a] | " | " | " | 0.1 $AlB_{12}$ | 0.15 | 5.3 | 4.2 |
| E | 15 Pt/55 Au | 2.9 Glass D<br>7.8 $Bi_2O_3$ | 19.3 | — | | 4.3 | — |
| 17 | " | " | " | 0.1 $AlB_{12}$ | 0.14 | 6.5 | — |
| F | 50 Ag | 2.3 Glass B<br>9.0 $Bi_2O_3$ | 38.7 | — | | 3.7 | — |
| 18 | " | " | " | 0.3 $AlB_{12}$ | 0.6 | 4.3 | — |

[a]Fired twice in belt furnace to 850°C.

A glassless composition of silver and 0.37% $AlB_{12}$, based on the weight of silver, was evaluated as a capacitor end termination. In Example 19 a composition of 80.2 parts silver, 19.5 parts vehicle and 0.3 parts $AlB_{12}$ was screen printed (165 mesh screen) as a 7/16 outside diameter circular print on both sides of a dense $BaTiO_3$ ceramic body (American Lava Corp. Kl300) one-half inch in diameter and 0.02 inch thick. The printed body was fired as in Example 1. Tinned copper lead wires were attached using a mildly activated rosin flux, dipping for about 4 seconds into a solder bath held at 215°C. (62 Sn/36 Pb/2 Ag). The leads were pulled with a Chatillon tester and found the exhibit an adhesion of 16 pounds.

In Showing G a standard silver end termination was similarly evaluated and found to have 14 pounds adhesion.

The silver composition contained no $AlB_{12}$, but 50 parts silver, 2.3 parts glass B, 9 parts $Bi_2O_3$, and 38.7 parts vehicle.

The noble metals were varied in these compositions; $AlB_{12}$ or mixtures thereof with various borides and silicides were used. Compositions and evaluations are set forth in Table IV.

The compositions were printed and fired as in Example 1. Adhesion of the fired metallizations to the substrate was evaluated by pressing Mylar-backed 3M Scotch adhesive brand tape over the 9 pads and pulling the tape off at 90°to the substrate. Adhesion was good for each sample, since no liftoff occurred. Solderability was evaluated using a mildly activated rosin flux, and immersing the fired metallizations in a 62 Sn/36 Pb/2 Ag solder at 215°C. for 10 seconds. Good uniform soldering was noted with all samples except those of Runs 21, 23, and 24, wherein soldering occurred, but was not uniform. Optimization of compositions would no doubt produce good soldering here also.

Example 32

Properties are similarly improved with compositions based on noble metal oxides such as PdO.

TABLE IV

| | Components of Composition (parts/wt.) | | | | | | | |
|---|---|---|---|---|---|---|---|---|
| | Noble Metal | | | | | | | |
| Example | Ag | Pd | Pt Pt | Au | Boride, etc. Additive | Other | Vehicle | Wt. $AlB_{12}$ as Percent of Noble Metal |
| 20 | 46.8 | 15.6 | — | — | 0.19 $AlB_{12}$ | — | 37.4 | 0.30 |
| 21 | 44.9 | 15.0 | — | — | 3.0 $AlB_{12}$ | — | 37.1 | 5.01 |
| 22 | — | 51.8 | — | 14.1 | 0.17 $AlB_{12}$ | — | 33.9 | 0.26 |
| 23 | — | 49.6 | — | 13.6 | 3.1 $AlB_{12}$ | — | 33.6 | 4.90 |
| 24 | — | — | 53.1 | 14.5 | 3.4 $AlB_{12}$ | — | 29 | 5.03 |
| 25 | 46.5 | 15.5 | — | — | 0.19 $AlB_{12}$ | 3.1 $Bi_2O_3$ | 34.7 | 0.31 |
| 26 | 46.5 | 15.5 | — | — | 0.19 $AlB_{12}$ | 3.1 PbO | 34.7 | 0.31 |
| 27 | 52.2 | 17.4 | — | — | 0.3 $AlB_{12}$ 0.3 $Fe_2B$ | — | 29.8 | 0.43 |
| 28 | 52.2 | 17.4 | — | — | 0.3 $AlB_{12}$ 0.3 $NbB_2$ | — | 29.8 | 0.43 |
| 29 | 52.2 | 17.4 | — | — | 0.3 $AlB_{12}$ 0.3 $CaB_6$ | — | 29.8 | 0.43 |
| 30 | 52.2 | 17.4 | — | — | 0.3 $Alb_{12}$ 0.3 $Cr_3Si$ | — | 29.8 | 0.43 |
| 31 | 52.2 | 17.4 | — | — | 0.3 $AlB_{12}$ 0.3 $TiSi_2$ | — | 29.8 | 0.43 |

I claim:

1. In metallizing compositions of a finely divided conductor powder selected from the class consisting of Pt, Pd, Au, Ag, and mixtures, alloys, and oxides thereof dispersed in an inert liquid vehicle, improved compositions additionally comprising finely divided aluminum boride; each of the aforesaid powders being sufficiently finely divided to pass through a 200-mesh screen; the aluminum boride being present in an amount equal to at least 0.05% of the weight of noble metal in the composition; the solids content of the composition being from 0.1–20 parts by weight of solids per part by weight of vehicle.

2. Compositions according to claim 1 additionally comprising a finely divided refractory additive powder which is elemental boron, a metal boride other than aluminum boride, a metal silicide, or mixtures thereof, the weight of said refractory additive powder being up to twice the weight of aluminum boride.

3. A composition according to claim 1 additionally comprising an inorganic oxide binder powder for said conductor powder, in an amount up to 50% of the weight of said conductor powder.

4. A composition according to claim 2 additionally comprising an inorganic oxide binder powder for said conductor powder, in an amount up to 50% of the weight of said conductor powder.

5. Compositions according to claim 1 wherein the conductor powder is Pt, Pd, Au, Ag, or mixtures or alloys thereof.

6. Compositions according to claim 2 wherein theh conductor powder is Pt, Pd, Au, Ag or mixtures or alloys thereof.

7. Compositions according to claim 3 wherein the conductor powder is Pt, Pd, Au, Ag or mixtures or alloys thereof.

8. Compositions according to claim 4 wherein the conductor powder is Pt, Pd, Au, Ag or mixtures or alloys thereof.

9. A conductor of the sintered powder of claim 1, adherent to a dielectric substrate.

10. A conductor of the sintered powder of claim 2, adherent to a dielectric substrate.

11. A conductor of the sintered powder of claim 3, adherent to a dielectric substrate.

12. A conductor of the sincered powder of claim 4, adherent to a dielectric substrate.

13. A conductor of the sintered powder of claim 5, adherent to a dielectric substrate.

14. A conductor of the sintered powder of claim 6, adherent to a dielectric substrate.

15. A conductor of the sintered powder of claim 7, adherent to a dielectric substrate.

16. A conductor of the sintered powder of claim 8, adherent to a dielectric substrate.

* * * * *